(12) United States Patent  
Isgar

(10) Patent No.: US 11,488,208 B2
(45) Date of Patent: Nov. 1, 2022

(54) SYSTEM FOR OBTAINING URLS OF BUSINESSES BASED ON GEO-IDENTIFICATION AREA

(71) Applicant: Charles Isgar, Scottsdale, AZ (US)

(72) Inventor: Charles Isgar, Scottsdale, AZ (US)

( * ) Notice: Subject to any disclaimer, the term of this patent is extended or adjusted under 35 U.S.C. 154(b) by 0 days.

(21) Appl. No.: 16/738,295

(22) Filed: Jan. 9, 2020

(65) Prior Publication Data

US 2020/0219131 A1    Jul. 9, 2020

Related U.S. Application Data

(60) Provisional application No. 62/790,248, filed on Jan. 9, 2019.

(51) Int. Cl.
    *G06Q 30/02*      (2012.01)
    *G06F 16/955*     (2019.01)
    (Continued)

(52) U.S. Cl.
    CPC ..... *G06Q 30/0261* (2013.01); *G06F 16/9558* (2019.01); *G06F 16/9566* (2019.01);
    (Continued)

(58) Field of Classification Search
    CPC .......... G06Q 30/0261; G06Q 30/0266; G06Q 30/0207–30/0277; G06F 16/9558;
    (Continued)

(56) References Cited

U.S. PATENT DOCUMENTS

| | | | |
|---|---|---|---|
| 8,160,304 B2* | 4/2012 | Rhoads | G06Q 30/06 455/556.1 |
| 2009/0286572 A1* | 11/2009 | Rhoads | H04N 1/32144 715/863 |

(Continued)

OTHER PUBLICATIONS

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Feb. 17, 2021.

(Continued)

*Primary Examiner* — Thuy N Nguyen
(74) *Attorney, Agent, or Firm* — Schmeiser, Olsen & Watts LLP

(57) ABSTRACT

Described is a system for obtaining Universal Resource Locators ("URLs") of specific locations, events, public services, businesses and other locations that maintain a URL based on geo-identification area of an identification area, wherein the system may utilize computing devices for implementing the system. The system automatically processes the location information of a user computing device and determine what businesses have a geo-identification area near the location of the user computing device. The system may then automatically find and retrieve geo-identified URL data corresponding to the businesses near the geo-identification area of the user computing device. Further, the system may automatically deliver the geo-identified URL data to the user computing device for access, wherein direct access includes geo-identified URL data viewable on the user computing device and is selectable to open a web browser on the user computing device directly to the URL of the business or location area.

9 Claims, 7 Drawing Sheets

(51) Int. Cl.
  *G06T 11/00* (2006.01)
  *H04L 67/02* (2022.01)
  *H04L 67/52* (2022.01)
  *G06F 3/0482* (2013.01)

(52) U.S. Cl.
  CPC .............. *G06T 11/00* (2013.01); *H04L 67/02* (2013.01); *H04L 67/52* (2022.05); *G06F 3/0482* (2013.01); *G06Q 30/0266* (2013.01)

(58) Field of Classification Search
  CPC .. G06F 16/9566; G06F 3/0482; G06F 3/0481; G06T 11/00; H04L 67/02; H04L 67/18
  See application file for complete search history.

(56) References Cited

U.S. PATENT DOCUMENTS

| | | | | |
|---|---|---|---|---|
| 2010/0008265 | A1* | 1/2010 | Freer | H04N 1/00307 455/414.1 |
| 2010/0293106 | A1* | 11/2010 | Rhoads | G06Q 30/02 348/161 |
| 2010/0318451 | A1 | 12/2010 | Niccolini et al. | |
| 2012/0208551 | A1 | 8/2012 | Hill | |
| 2012/0240077 | A1* | 9/2012 | Vaittinen | G06F 3/04815 715/781 |
| 2013/0027227 | A1* | 1/2013 | Nordstrom | G08G 1/202 340/990 |
| 2013/0073389 | A1* | 3/2013 | Heath | G06Q 50/01 705/14.54 |
| 2014/0079320 | A1* | 3/2014 | Hamming | G06V 10/25 382/190 |
| 2014/0100994 | A1* | 4/2014 | Tatzel | G06Q 30/0276 705/27.1 |
| 2014/0168056 | A1* | 6/2014 | Swaminathan | G06F 3/0481 345/156 |
| 2014/0171039 | A1* | 6/2014 | Bjontegard | A63F 13/217 455/414.1 |
| 2014/0279018 | A1* | 9/2014 | Hardin | G06Q 30/0261 705/14.58 |
| 2014/0330814 | A1* | 11/2014 | Li | G06F 16/248 707/722 |
| 2015/0199436 | A1 | 7/2015 | Bailey et al. | |
| 2016/0019618 | A1* | 1/2016 | Lin | G06K 9/00456 705/26.61 |
| 2016/0098755 | A1* | 4/2016 | Silvestro | G06Q 30/0261 705/14.56 |
| 2018/0144524 | A1* | 5/2018 | Lotto | G06Q 10/109 |
| 2018/0196819 | A1 | 7/2018 | Zhang et al. | |
| 2018/0253145 | A1* | 9/2018 | Swaminathan | G06F 3/013 |
| 2018/0261186 | A1* | 9/2018 | Watson | G06F 3/147 |
| 2019/0179405 | A1* | 6/2019 | Sun | G06F 1/1686 |
| 2019/0244248 | A1* | 8/2019 | Purves | G06Q 20/40145 |
| 2019/0251719 | A1* | 8/2019 | Wang | H04W 4/026 |
| 2020/0082423 | A1* | 3/2020 | Glazier | H04L 67/535 |

OTHER PUBLICATIONS

Isgar, Charles, System for Interaction Regarding Real Estate Sales, Social and Business, Patent Cooperation Treaty Application Serial No. PCT/US21/12904, Filed Jan. 11, 2021, International Search Report and Written Opinion dated Mar. 3, 2021.

\* cited by examiner

SYSTEM FOR OBTAINING URLS OF BUSINESSES BASED ON GEO-IDENTIFICATION AREA

CROSS REFERENCE TO RELATED APPLICATION

This application claims priority to U.S. Provisional Patent Application to Charles Isgar entitled "SYSTEM FOR OBTAINING URLS OF BUSINESSES BASED ON GEO-IDENTIFICATION AREA," Ser. No. 62/790,248, filed Jan. 9, 2019, the disclosure of which is hereby incorporated entirely herein by reference.

BACKGROUND OF THE INVENTION

Technical Field

This invention generally relates to a point and reference URL searching system, and specifically to a system for obtaining URLs of specific locations, events, public services, businesses and other locations that maintain a URL based on a specified geo-identification area, wherein the system may utilize computing devices for implementing the system.

STATE OF THE ART

Individuals typically travel to or for work, for recreation, for vacation, for shopping and for any number of reasons. This travel may be by vehicle as a driver or passenger, by walking, by bicycles and the like. Often there are certain businesses and locations that the individual passes and may wish to obtain more information regarding that entity. This is particularly the case in the travel industry where visitors of locales may not know or are in search of information regarding businesses near them. Currently, this is generally done by the individual locating the name of the business and entering it into the search engine of choice on the user's phone to hopefully obtain the correct URL associated with the business of interest, while trying to sift through the various filters of paid or algorithmically derived search results. There is a lack of systems that allow for direct access to a Universal Resource Locator ("URL") or web address of a business or other location area.

Accordingly, what is needed is a system for a user to obtain URLs of nearby businesses based on geo-identification area and providing direct access to the URLs without reliance upon social media or utilizing Internet search engines with their various filters and rankings.

SUMMARY OF THE INVENTION

An embodiment includes a system for obtaining URLs of businesses based on geo-identification area, the system comprising: a server having a memory storing geo-identified URL data; and a user computing device coupled to the server, wherein the server is programmed to: receive location information from the user computing device; automatically process the location information and determine what businesses have a geo-identification area near the location of the user computing device; automatically find and retrieve geo-identified URL data corresponding to the businesses near the geo-identification area of the user computing device; and automatically deliver the geo-identified URL data to the user computing device for direct access, direct access may include geo-identified URL data 26 viewable as floating identifiers over each business or location area, wherein selecting the floating identifier opens a web browser on the user computing device and is automatically directed to the URL of the business or location area.

The foregoing and other features and advantages of the invention will be apparent to those of ordinary skill in the art from the following more particular description of the invention and the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a system for obtaining URLs of businesses based on geo-identification area. The system may be a mixed reality system operating on a user computing device that may be a mobile computing device, wherein the user computing device can be utilized to display floating identifiers of URL data regarding certain businesses to be locationally associated with the certain businesses, floating above the businesses and accessible by user computing devices. The user can adjust the system for preferred search distance and area.

Figure 1:
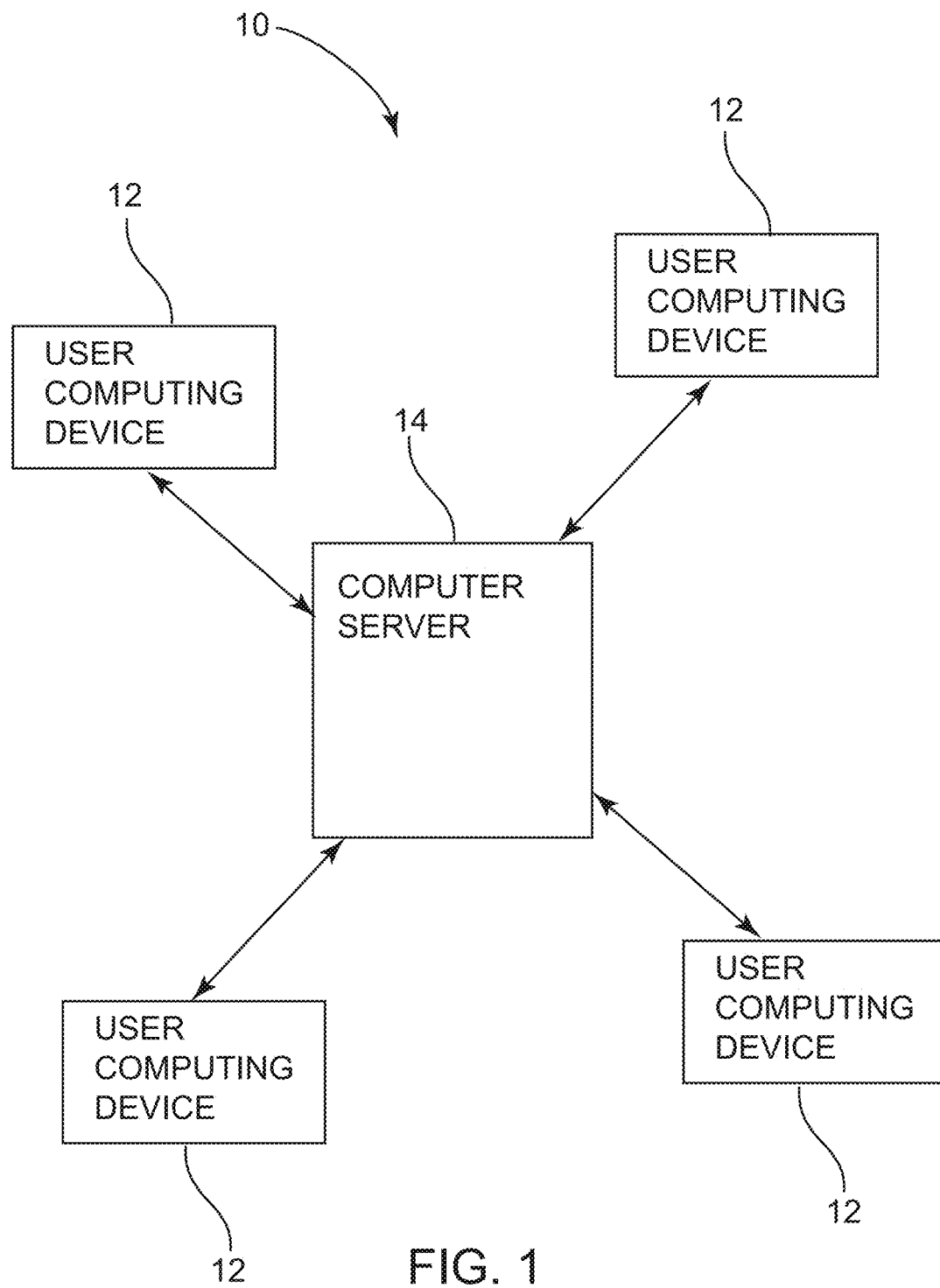
FIG. 1 a diagrammatic view of a system for obtaining URLs of businesses based on geo-identification area according to an embodiment.
Figure 2:
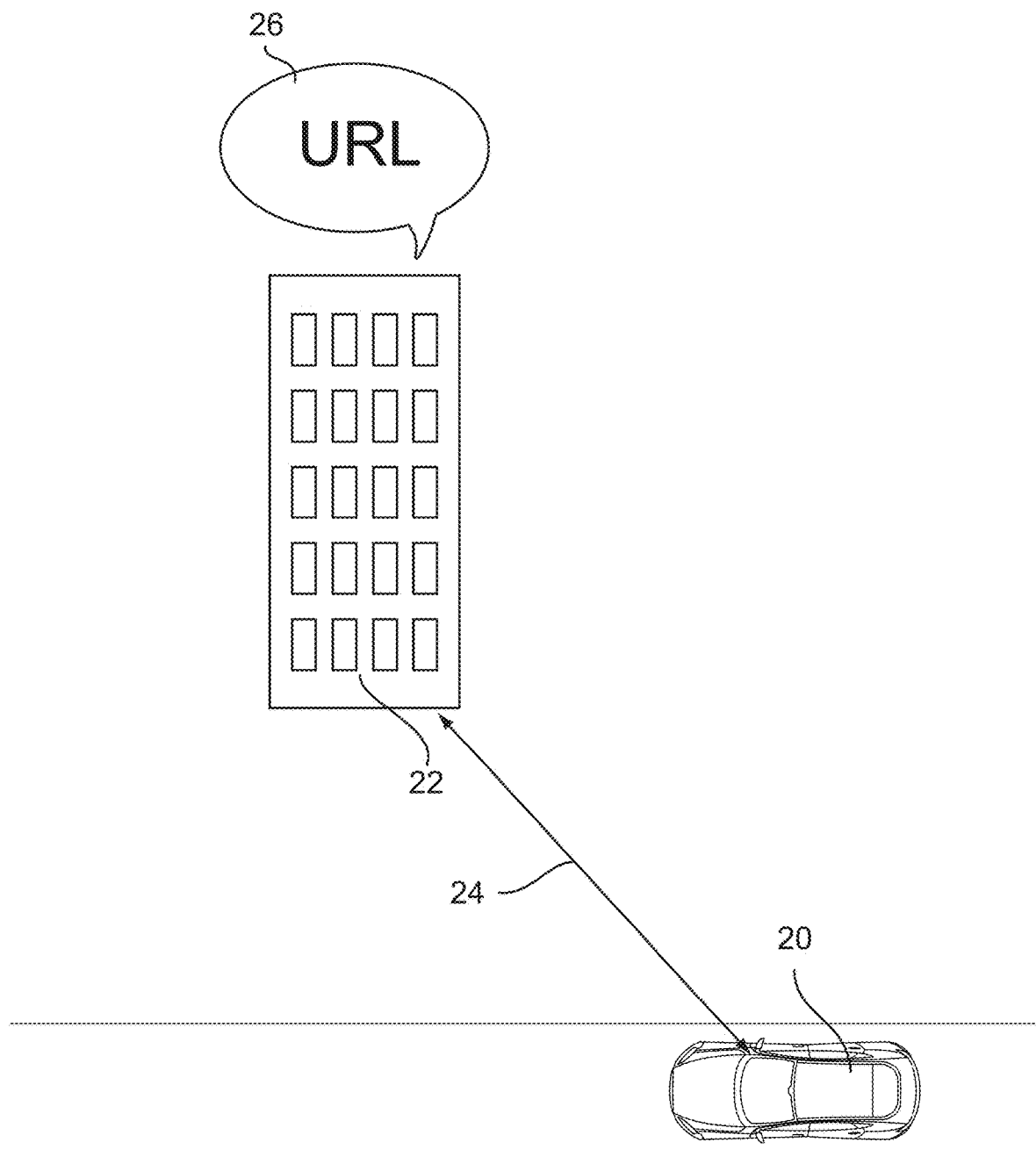
FIG. 2 depicts a system for obtaining URLs of businesses based on geo-identification area used by an occupant of a vehicle that is a predetermined distance from a geo-identification area of a business according to an embodiment.
Figure 3:
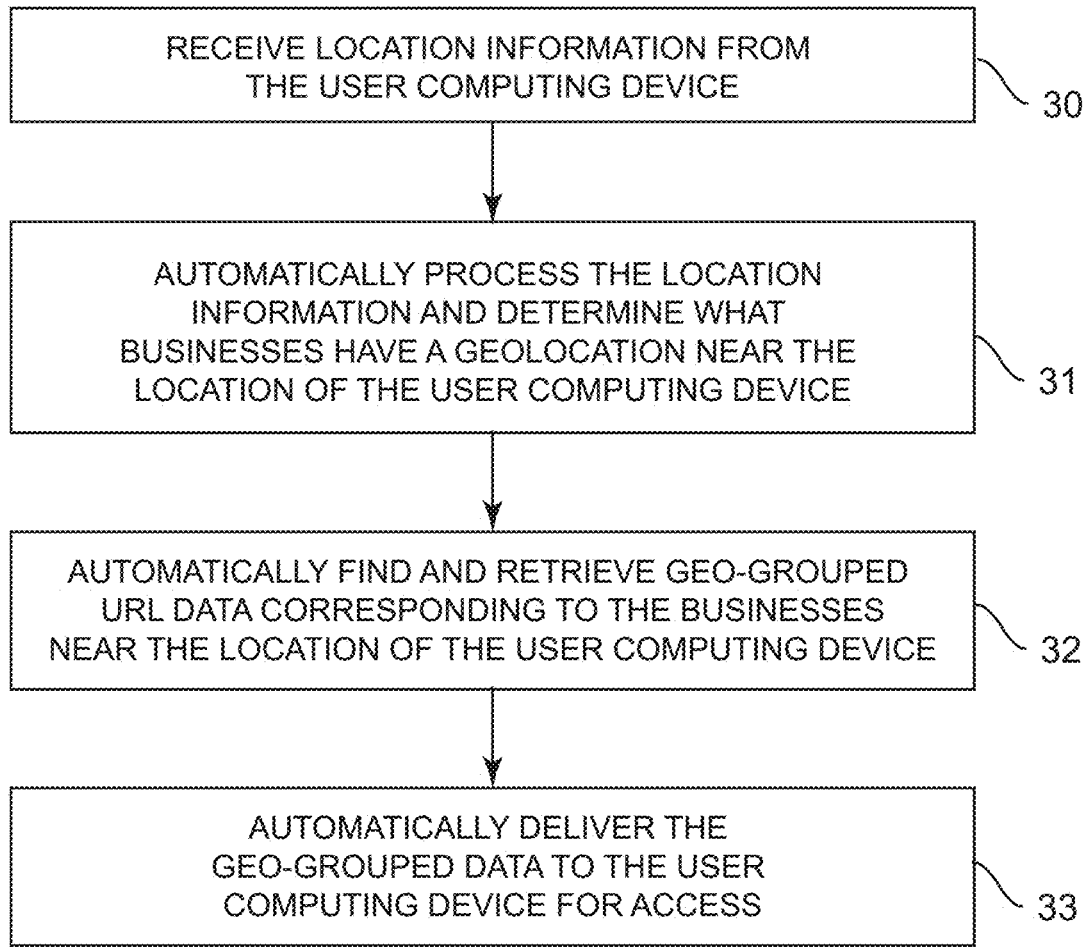
FIG. 3 is a flowchart of programmed instructions executed by a server of a system for obtaining URLs of businesses based on geo-identification area according to an embodiment.
Figure 4:
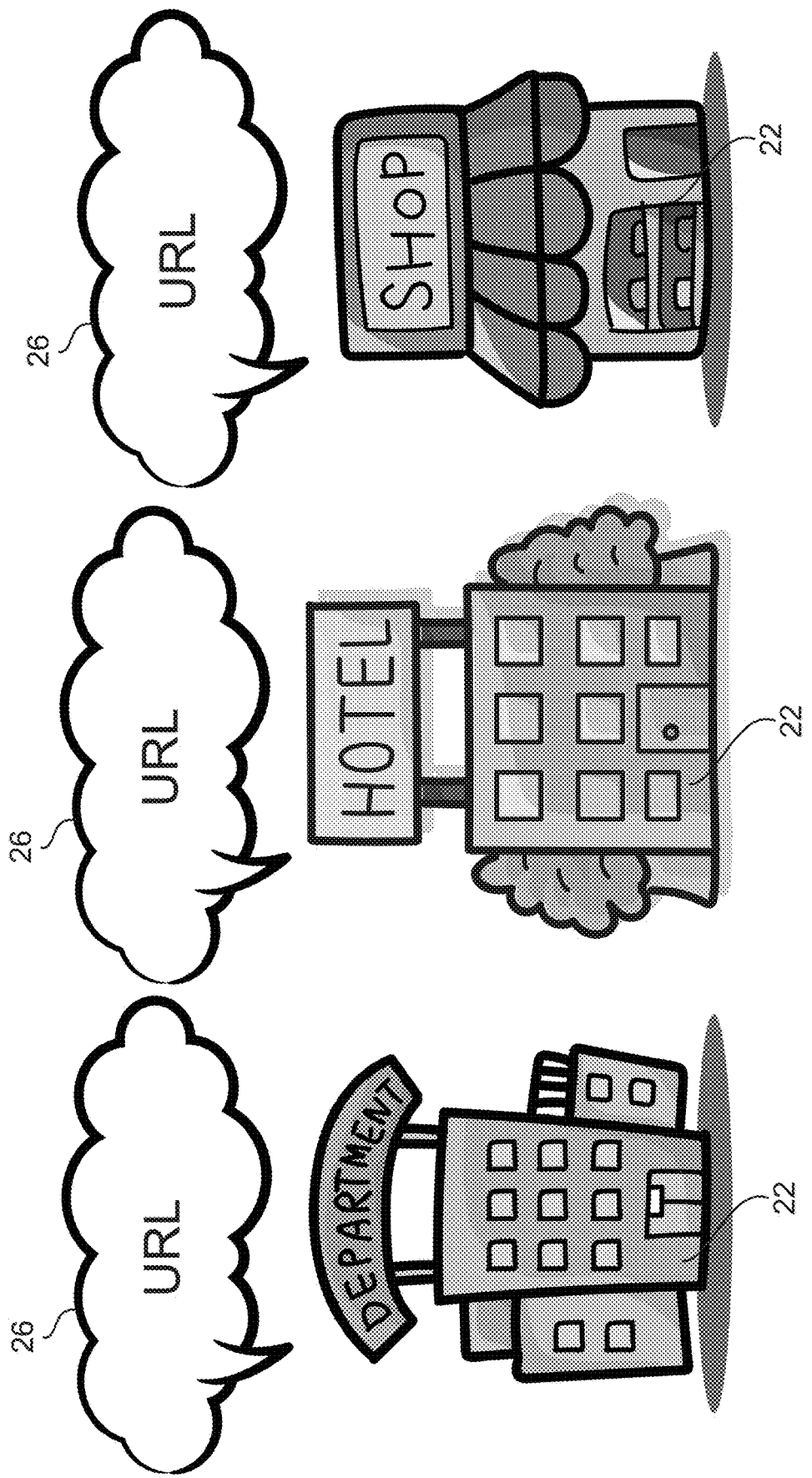
FIG. 4 depicts a system for obtaining URLs of businesses based on geo-identification area with bubbles of data according to an embodiment.
Figure 5:
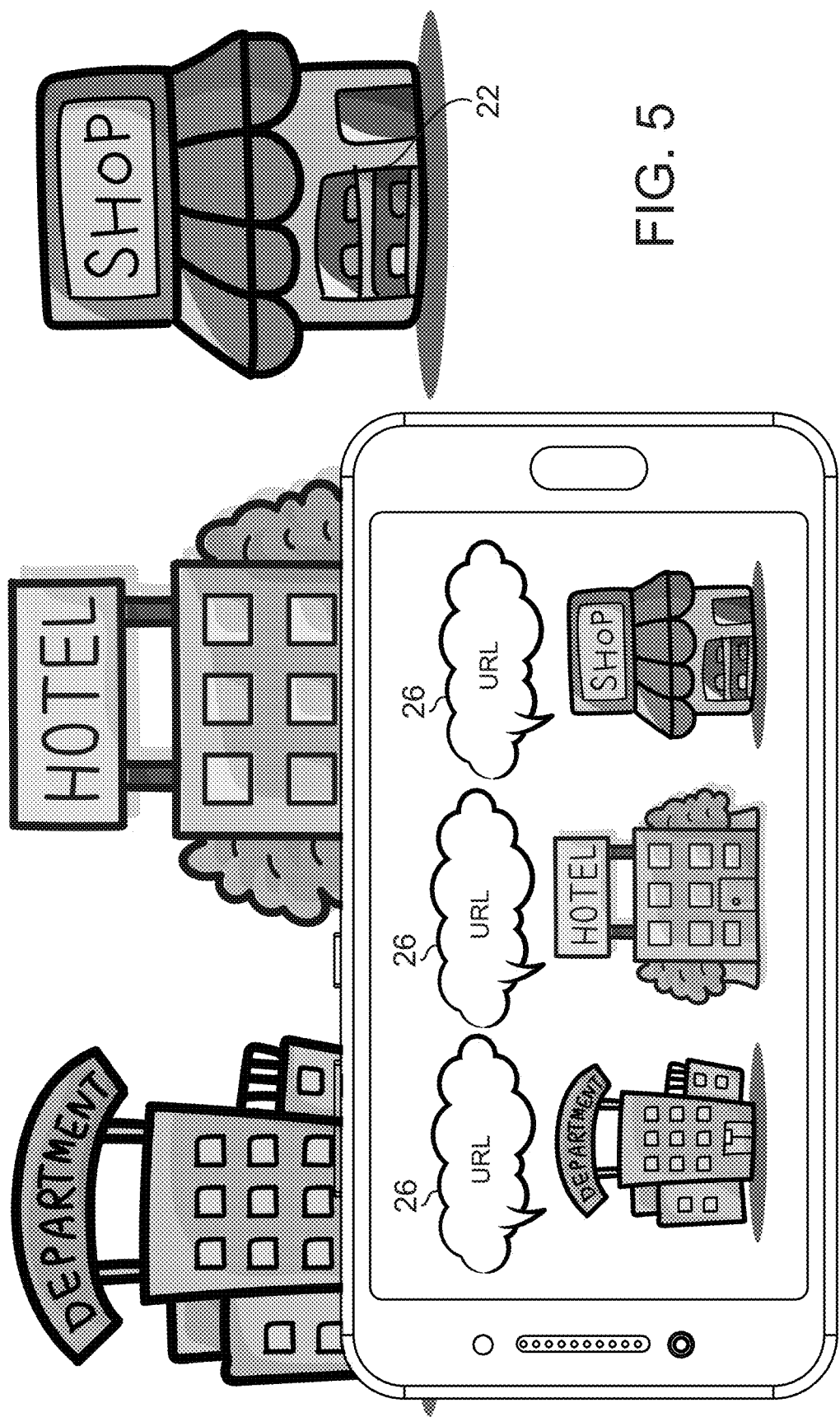
FIG. 5 depicts a system for obtaining URLs of businesses based on geo-identification area with bubbles of URL according to an embodiment.

FIGS. 1-3 show an embodiment of a system 10 for social interaction regarding features based on geo-identification area. FIG. 1 shows a diagram of a system 10 for obtaining URLs of businesses based on geo-identification area. FIG. 2 depicts a system 10 for obtaining URLs of businesses based on geo-identification area used by an occupant of a vehicle, such as a car, a bus, a train or the like. FIG. 3 shows a flow chart of programming of a system 10 for obtaining URLs of businesses based on geo-identification area. In embodiments, a user includes a driver, a passenger or the like in any type of vehicle, and further may include an individual walking, riding a bike, riding a scooter, or any other form of moving from one location to another location.

FIG. 1 depicts an embodiment of a system 10 for obtaining URLs of businesses based on geo-identification area. The system 10 may include user computing devices 12 and a server 14, wherein each user computing device 12 is coupled to the computer server 14. This coupling may be a network connection, such as a wireless connection through an Internet connection, a Wi-Fi connection, a Bluetooth connection or the like, wherein the user computing devices 12 may communicate with and receive communication from the server 14. The user computing device 12 may include a desktop computer, a laptop, a tablet, a smartphone, a vehicle-installed computing device and the like. The server 14, in some embodiments, may be a computer server or a cloud-based infrastructure architecture.

The server 14 may include a memory storing various data. The memory of the server 14 may store URL data and location information corresponding to a particular business, wherein location information for a business is associated with each URL regarding the business and stored as a geo-identified URL data. In other words, the URLs regarding a particular business are grouped together based on the geo-identification area of the business and are accessible to all users of the system 10.

The user computing device 12 may be coupled to the server 14, and, referring to FIGS. 2 and 3, the server 14 may be programmed to receive location information from the user computing device (Step 30); automatically process the location information and determine what businesses have a geo-identification area near the location of the user computing device (Step 31); automatically find and retrieve geo-identified URL data 26 corresponding to the businesses near the geo-identification area of the user computing device (Step 32); and automatically deliver the geo-identified URL data 26 to the user computing device for direct access (Step 33). In embodiments, direct access may include geo-identified URL data 26 viewable as floating identifiers over each business or location area, wherein selecting the floating identifier opens a web browser on the user computing device and is automatically directed to the URL of the business or location area.

In some embodiments, the user computing device 12 may be utilized by an occupant of a vehicle 20 (See FIG. 2). The user computing device 12 may be operating a mobile app as part of the system 10, wherein operation of the mobile app couples the user computing device 12 to the server 14. The user computing device 12 operating the mobile app, may further be operated to determine its location and send the location data to the server through the established connection. This location data, for example, may be location data obtainable by a smartphone and then sent to the server 14.

As shown in FIG. 2, the user computing device 12 may be within vehicle 20 and the location may be sent to the server 14. The location may be within a predetermined distance 24 of the geo-identification area of the business 22, thereby initiating the sending of geo-identified URL data 26 corresponding to the geo-identification area of the business 22 to the user computing device 12 within the vehicle 20. Examples of how the geo-identified URL data 26 is displayed is shown in FIGS. 4-7.

Once the geo-identified URL data 26 is sent to the user computing device 12, the geo-identified URL data 26 is automatically displayed. In some embodiments, there may be several businesses that are available based on the location of the user computing device 12. In these instances, the server 14 may be programmed to send a list of geo-identified URL data to the user computing device 12 for selection. The list may include different businesses, wherein the user may select a desired geo-identified URL data associated with a desired business to access on the user computing device 12. Further still, the server 14 may also be programmed to send a list of geo-identified URL data to the user computing device for selection, the list including different content types of geo-identified URL data of the business or multiple businesses. The different content types of geo-identified URL data may include hyperlinked text URLs or advertisements that are hyperlinked to a URL, wherein the advertisements may include photos, graphics, videos, audio and the like.

Figure 6:
FIG. 6 depicts a system for obtaining URLs of businesses based on geo-identification area in an augmented reality or a mixed reality environment according to an embodiment.
Figure 7:
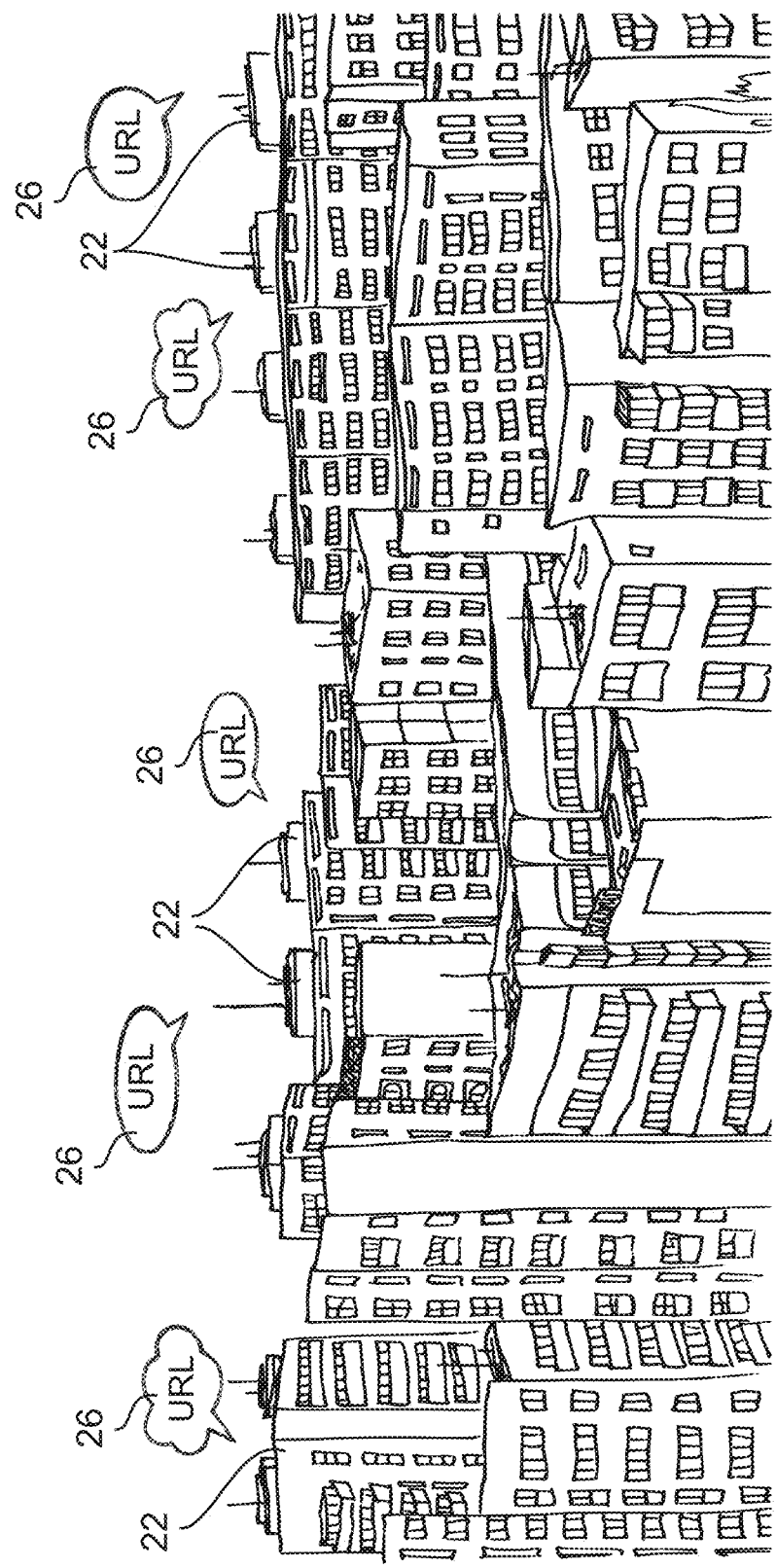
FIG. 7 depicts a system for obtaining URLs of businesses based on geo-identification area according to an embodiment.

It will be understood that the geo-identified URL data may be displayed as identifiers, such as bubbles, of data floating above each feature in a mixed reality environment on the user computing device 12, wherein the floating identifiers are selectable on the user computing device 12 in order to be directed or automatically clicked through to the URL, and may even open the URL through a native or installed web browser on the user computing device, as shown in FIG. 6.

It is contemplated that a user that is a driver of a vehicle may elect to receive the geo-identified URL data in a form that complies with state driving laws, while passengers may have the same or alternative feeds of information.

By way of example only, and not as a limitation, operation of the system 10 may include a user traveling on a bus by a certain business while on vacation in a particular city. The user is operating a user computing device 12 that is the user's smartphone operating a mobile application to access the system 10. The location information of the user computing device 12 is automatically being sent to the server at intervals or continuously. The server 14 process the information to determine that the bus and the user within it are within a predetermined distance of a geo-identification area of the certain business. The server 14 automatically send the geo-identified URL data 26 to the user computing device 12 for display and access by the user. The geo-identified URL data 26 may be provided as floating identifiers of data, such as a bubble, including text, photos, videos and the like of all users that have posted regarding the certain business displayed on a screen of the user computing device. The user may consume the geo-identified URL data 26 by selecting the floating identifiers of URL data on the user computing device to be directed to the website of the certain business. Visually presented, the system 10 allows for floating identifiers of URL data regarding certain businesses to be locationally associated with the certain businesses and displayed as floating above the business in order to be accessible by user computing devices 12 within a certain proximity of the geo-identification area of the certain business. It allows searching for business websites by simply panning a smartphone, tablet, wearable around an area of the user and clicking on the floating identifier, such as a bubble, of URL data above a business, wherein users are no longer surfing the web, but surfing the sky to find business websites. Additionally, the bubble or other URL identifier on the user computing devices can have various shapes, sizes, and colors to indicate frequently requested URLs.

In embodiments, the system may include geo-identified URL data 26 viewable as floating identifiers over each business or location area on a user computing device 12 in a mixed reality environment, augmented reality environment or otherwise, wherein the floating identifiers may be displayed on the screen of the user computing device utilizing a camera lens coupled the user computing device to scan and view each business with the camera lens (within the line of sight of the camera), wherein the system displays on the user computing device the business with the floating identifier, such that selecting the floating identifier opens a web browser on the user computing device and is automatically directed to the URL of the business or location area.

Embodiments may be available on or through the internet, such as through domain names reserved and owned by Applicant that include URLbubble.com, FloatingURL.com, URL-finder.com, URLdirect.com or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

What is claimed is:

1. A system for obtaining URLs of businesses based on geo-identification area, the system comprising:
a server having a memory storing geo-identified URL data; and
at least one user computing device comprising a camera and a screen, the at least one user computing device coupled to the server, wherein the server is programmed to:
receive location information from the at least one user computing device;
automatically process the location information and determine what businesses have a geo-identification area near the location of the at least one user computing device;
automatically find and retrieve geo-identified URL data corresponding to the businesses having a geo-identification area near the location of the at least one user computing device; and
automatically deliver the geo-identified URL data to the at least one user computing device for direct access, wherein direct access comprises displaying on the screen a view of each business captured by the camera and the geo-identified URL data for each business having a geo-identification area near the location of the at least one user computing device as a floating identifier proximate each business as displayed on the screen in response to instruction sent from the server to the at least one user computing device, the geo-identified URL data comprising geo-identified URL data sent from the server to the at least one user computing device for selection, wherein the floating identifiers comprise different shapes, sizes, or colors to indicate weighting of the geo-identified URL data, and wherein the user may select a desired geo-identified URL data associated with a desired business of the businesses displayed on the screen to access the desired geo-identified URL data.

2. The system for obtaining URLs of businesses of claim 1, wherein the at least one user computing device is located within a vehicle and is operable by a user within the vehicle.

3. The system for obtaining URLs of businesses of claim 1, wherein the at least one user computing device is configured to operate a mobile application installed thereon, wherein operation of the mobile application couples the at least one user computing device to the server.

4. The system for obtaining URLs of businesses of claim 3, wherein operation of the mobile application further determines the location of the at least one user computing device and sends location data including the location of the at least one user computing device to the server through the established connection.

5. The system for obtaining URLs of businesses of claim 4, wherein location of the at least one user computing device within a predetermined distance of a business initiates the sending of geo-identified URL data corresponding to the business from the server to the at least one user computing device for automatic display on the at least one user computing device.

6. The system for obtaining URLs of businesses of claim 1, wherein the list of geo-identified URL data further comprises a plurality of content types of geo-identified business data associated with each business, respectively, wherein the user may select from the plurality of content types of geo-identified URL data to access on the user computing device.

7. The system for obtaining URLs of businesses of claim 6, wherein the plurality of content types of geo-identified URL data includes at least one of a hyperlinked text URL, an advertisement hyperlinked to a URL, or a combination thereof, wherein the advertisement is one of a photo, a graphic, a video, an audio, or any combination thereof.

8. The system for obtaining URLs of businesses of claim 1, wherein selecting the floating identifier opens a web browser on the at least one user computing device and automatically directs the at least one user computing device to the URL of the business.

9. The system for obtaining URLs of businesses of claim 1, wherein weighting of the geo-identified URL data comprises frequently requested URLs.

* * * * *